United States Patent [19]

Holtz

[11] Patent Number: 4,808,148
[45] Date of Patent: Feb. 28, 1989

[54] TEMPERATURE COMPENSATED SELF-TENSIONING IDLER PULLEY

[75] Inventor: Glen D. Holtz, Brighton, Mich.

[73] Assignee: Federal-Mogul Corporation, Southfield, Mich.

[21] Appl. No.: 176,915

[22] Filed: Apr. 4, 1988

[51] Int. Cl.⁴ .................................................. F16H 7/10
[52] U.S. Cl. ...................................... 474/112; 474/135
[58] Field of Search .............. 474/101, 109, 111, 112, 474/113–115, 117, 118, 133, 135; 74/411, 411.5

[56] References Cited

U.S. PATENT DOCUMENTS

| Re. 30,842 | 1/1982 | Speer | 474/135 |
|---|---|---|---|
| 2,051,488 | 8/1936 | Kottlowski et al. | 474/112 |
| 2,337,591 | 12/1943 | Coulson | 474/112 |
| 2,575,313 | 11/1951 | Covert et al. | 474/112 X |
| 4,464,146 | 8/1984 | Arthur | 474/133 |
| 4,464,147 | 8/1984 | Foster | 474/135 |
| 4,472,162 | 9/1984 | Hitchcock | 474/135 |
| 4,473,362 | 9/1984 | Thomey et al. | 474/135 |
| 4,551,120 | 11/1985 | Thomey | 474/112 X |
| 4,610,645 | 9/1986 | Donn et al. | 474/112 |
| 4,618,335 | 10/1986 | Brandenstein et al. | 474/112 |
| 4,634,407 | 1/1987 | Holtz | 474/112 |

*Primary Examiner*—Thuy M. Bui
*Attorney, Agent, or Firm*—Lawrence J. Shurupoff; Robert F. Hess

[57] ABSTRACT

A belt tensioning device includes a resilient coupling which interconnects an idler pulley hub and a stationary mounting member. A ratchet and pawl mechanism interconnects the hub and the stationary mounting member to prevent the belt from overcoming the biasing force of the tensioning device during high belt loads. A resilient biasing element such as an elastomeric element is located between the ratchet and pawl mechanism and the stationary mounting member to allow limited movement of the idler pulley hub away from a belt in order to relieve belt tension such as caused during thermal expansion of an engine block.

10 Claims, 2 Drawing Sheets

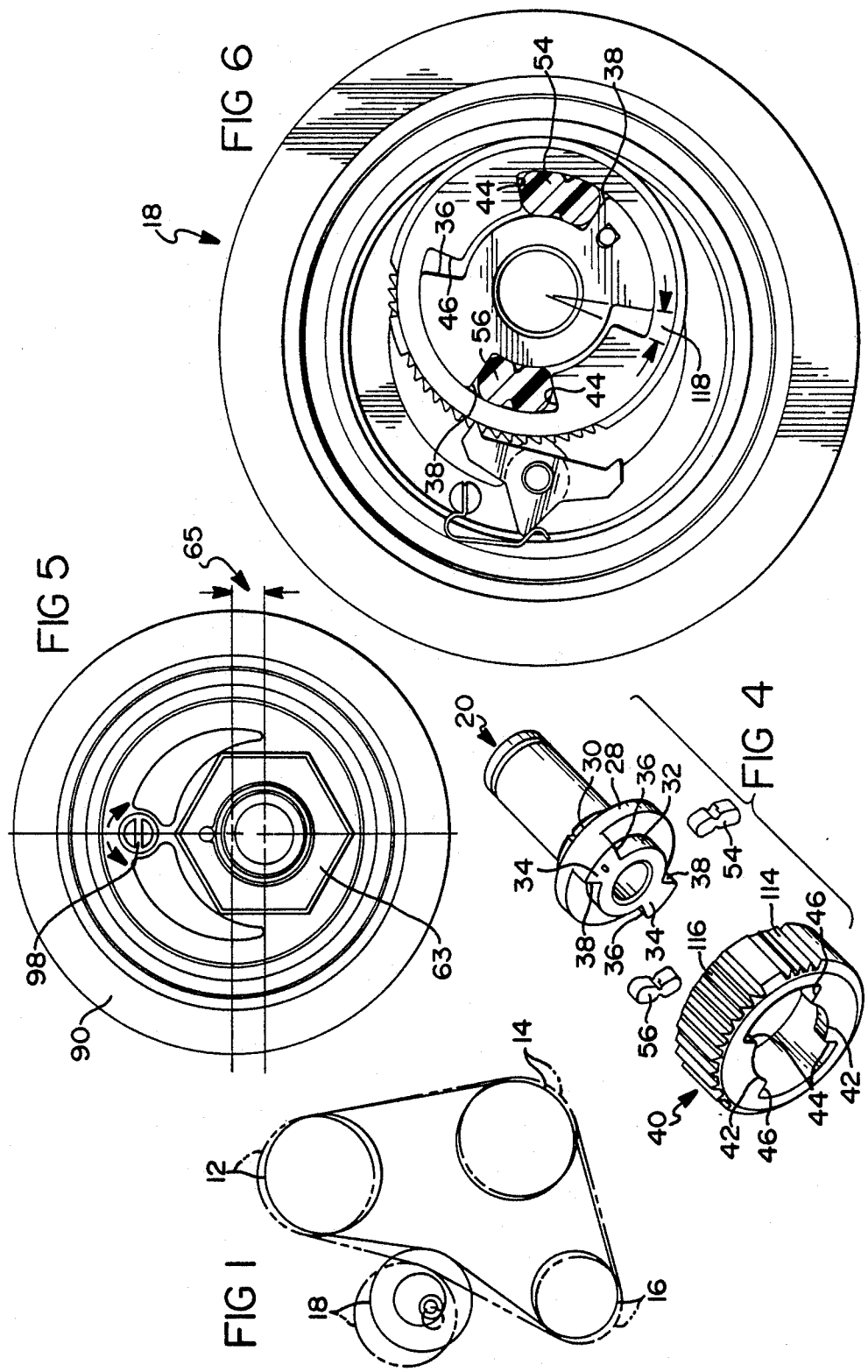

TEMPERATURE COMPENSATED SELF-TENSIONING IDLER PULLEY

BACKGROUND OF THE INVENTION

1. Field of the Invention

This invention relates generally to a belt or chain tensioning device and particularly concerns a tensioning device which accommodates thermal expansion between a series of pulleys engaged with a common belt or chain.

2. Description of Prior Developments

Belt tensioning devices are well known and exist in numerous forms. A common arrangement includes a tensioning member, commonly a torsion spring, which urges a belt tensioning idler pulley against an endless belt to control the tension in the belt and to maintain the engagement of the belt with its associated pulleys. It is necessary to control belt tension in order to prevent the belt from slipping about the pulleys over which the belt travels and for controlling belt wear.

Some tensioning devices have been designed with a fixed idler pulley while others have been designed with a movable idler pulley provided with a motion limiting ratchet and pawl. The ratchet and pawl mechanism prevents an endless belt such as a timing belt or accessory drive belt from overcoming the biasing force of the tensioning member. When the biasing force is overcome, he belt can lose synchronization or slip over the pulleys thereby causing a loss of timing or traction.

An example of a tensioning mechanism incorporating a ratchet and pawl is disclosed in U.S. Pat. No. 4,634,407. While this device performs satisfactorily, an additional need has been found for accommodating the thermal expansion of the base or support upon which the pulleys and the tensioner mechanism are mounted. For example, when a series of pulleys are mounted to an engine block, the relative distances between the pulleys increases as the engine heats up and thermally expands. The result of this thermal expansion is a significant increase in belt tension as the belt is stretched over the pulleys.

Without some form of tension relief, the belt can be over stressed to a point where it is damaged and its useful life is shortened. This problem is particularly acute in those belt drive systems which incorporate a fixed idler pulley or ratcheting mechanism in their tensioners. The fixed position of the idler is typically maintained either by a static pulley mount or by a ratchet, both of which prevent the tensioner from relieving the increased belt tension caused by thermal expansion. In those belt tensioning systems without a ratcheting mechanism, the stretched belt simply displaces the idler pulley by overcoming the force of its tensioning element thereby relieving the belt tension to some extent. This relief has not been available with tensioners which incorporate ratcheting mechanisms.

Accordingly, a need exists for a belt tensioner of the type which includes a ratcheting mechanism for taking up belt slack caused by belt stretching and seating yet which provides for a degree of belt tension relief needed during thermal expansion between the pulleys over which the belt travels.

SUMMARY OF THE INVENTION

The present invention has been developed to satisfy the needs noted above and therefore has as a primary object the provision of a self-tensioning belt or chain tightener which accommodates thermal expansion between and/or among adjacent pulleys in order to limit to acceptable levels the tension within an associated pulley belt. The invention is particularly applicable to belt tensioning mechanisms which incorporate ratchets for preventing movement of an idler pulley away from a belt.

Briefly, these objects are achieved by coupling the ratcheting mechanism of the tensioner with an additional biasing member such as an elastomeric element, fluid or hydraulic element or a coil spring. Instead of preventing any significant movement of the tensioner idler pulley away from the belt with a rigidly fixed ratchet and pawl, the present invention provides for a preferably controlled release of belt tension by allowing the entire ratcheting mechanism and idler pulley to rotate outwardly or away from the expanding belt by overcoming the resistance of a secondary biasing element. This tension relieving movement is controlled according to the invention by the compression of an elastomeric element or coil spring which transmits the reactionary force of the idler pulley to a stationary mount such as a mandrel fixed to an engine block.

The realization of these objects and various other objects, features and attendent advantages of the present invention will be more fully appreciated from the following detailed description when considered in connection with the accompanying drawings, in which the same reference numbers designate the same or corresponding parts throughout.

BRIEF DESCRIPTION OF THE DRAWINGS

In brief, the drawings include:

FIG. 1 which is a schematic view of a belt system showing how thermal expansion between pulleys can stretch a belt;

FIG. 4 is an exploded perspective view of the resilient connection between the mandrel and ratchet;

FIG. 5 is a reduced front elevation view of the tensioner;

FIG. 6 is a rear elevation view of the tensioner in an operative belt engaging position.

DETAILED DESCRIPTION OF THE PREFERRED EMBODIMENT

Figure 3:
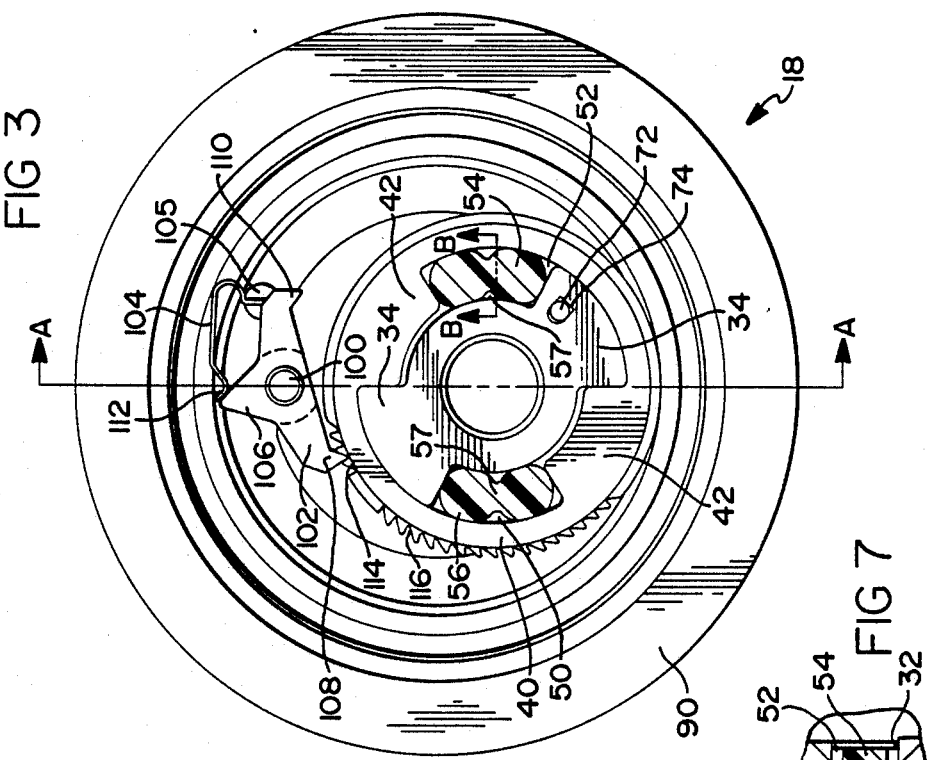
FIG. 3 is a rear elevation view of the tensioner in a pre-wound inoperative storage position shown dismounted from an engine block.
Figure 7:
FIG. 7 is an enlarged fragmental sectional view taken through line B—B of FIG. 3.

The general operation of the belt tensioner of the present invention is best appreciated from a review of FIG. 1 which shows, for example, a timing belt (10) running over a plurality of rotating members such as camshaft pulley (12), distributor pulley (14) and crankshaft pulley (16). A belt tensioner (18) is shown applying an inwardly directed biasing force to the belt with an idler pulley to prevent the belt from slipping over the pulleys.

The biasing force of the idler pulley is maintained at a near constant level against the belt to improve the performance and extend the useful life of the belt. As the belt is "broken in" it tends to stretch and wear.

Without the aid of the belt tensioner, the belt would begin to slip over the pulleys causing a loss of synchronization, belt whip, intermittent driving torque and severe belt wear.

As further seen in FIG. 1, the distance between the pulleys can increase as the engine block (not shown) to which the pulleys are mounted heats up. As the engine block thermally expands, the belt (10) can be stretched as the pulleys (12, 14 and 16) and tensioner (18) move outwardly or away from one another to the positions represented in phantom. Without some mode of tension relief, such as provided by the tensioner (18), the belt (10) would be stretched or tensioned to unacceptable limits.

The detailed construction and operation of the belt tensioner (18) is depicted in FIGS. 2 through 7 which disclose a belt tensioner similar to that disclosed in U.S. Pat. No. 4,634,407, the disclosure of which is incorporated herein by reference. The present invention has been developed to add the capability of accommodating thermal expansion within the general structure of U.S. Pat. No. 4,634,407.

Figure 2:
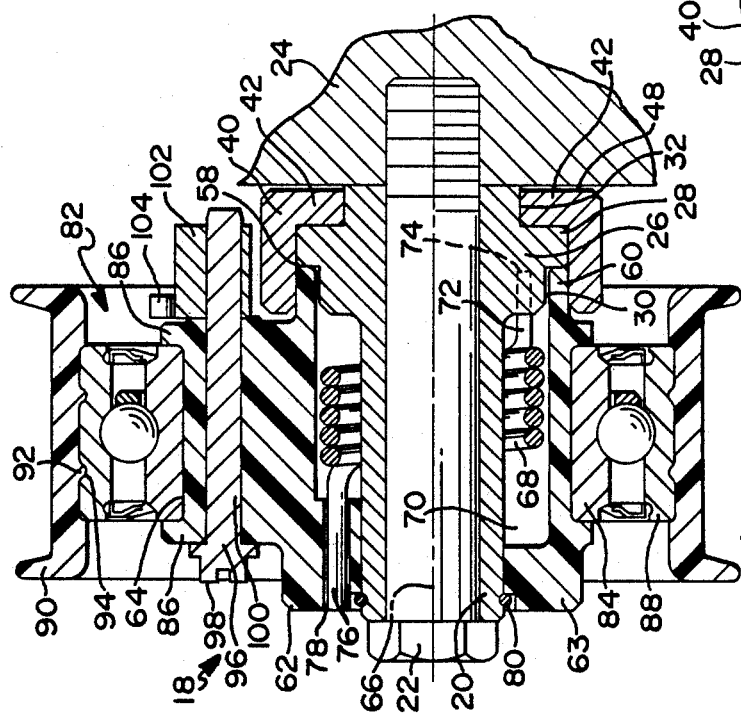
FIG. 2 which is a longitudinal sectional view of a preferred embodiment of the tensioner, taken along line A—A of FIG. 3 and including a mounting portion of an engine block.

Referring now to FIG. 2, the belt tensioner (18) is shown to include a tubular mandrel (20) for receiving a bolt (22) threaded at one end for securely fastening the belt tensioner to a support base such as engine block (24). When the bolt is tightened, the mandrel becomes immovably clamped to the engine block. The mandrel is formed with an enlarged base region (26), which, as best seen in FIGS. 2 and 4, includes an annular flange (28) which is axially bounded between a front annular step (30) and a rear annular step (32).

A pair of radially outwardly projecting engagement members such as engagement arms (34) (FIG. 4) extends from diametrically opposed sides of the rear annular step (32) to the outer circumferential edge of the annular flange (28). Each arm (34) is formed with opposed engagement surfaces 36, 38. Although a pair of engagement arms is preferred, at least one engagement arm is required to carry out the invention as detailed below.

A coupling member such as coupling sleeve (40) is provided with at least one and preferably two or more radially inwardly projecting engagement arms (42). Each engagement arm is formed with a pair of opposed radially extending engagement surfaces (44, 46). As seen in FIGS. 2 and 3, the coupling sleeve (40) is closely but freely fitted around the annular flange (28) of the mandrel (20).

This free concentric fit allows the coupling sleeve to rotate around the mandrel within the limits described below. To ensure this free rotation, the axial width of each engagement arm (42) is dimensioned slightly less than the axial width of the rear annular step (32) about which each arm rotates to provide an axial clearance (48) (FIG. 2) between the engagement arms (42) and the engine block (24). This clearance prevents the coupling sleeve from being pinned or clamped against the engine block (24).

Referring to FIGS. 3, 4, 6 and 7 it can be seen that by mounting the coupling sleeve (40) over the mandrel (20), a pair of pockets (50, 52) is defined therebetween for receiving a pair of biasing elements such as elastomeric elements (54, 56). Rotation of the coupling sleeve is limited by the compression of the biasing elements. It should be emphasized that any biasing element may be used such as a compression spring, fluid bladder or the like, although an elastomeric element is preferred for its ability to effectively damp belt vibrations. It has been found that a polyacrylate or an ethylene acrylic elastomeric material such as VAMAC or a fluoroelastomer such as VITON having a durometer between 60 and 100 performs satisfactorily. Although two biasing elements are shown, only one is required to carry out the invention.

It is preferable to dimension the volume of the pockets (50, 52) in their unactivated mode where the elastomeric elements are not compressed (as seen in FIG. 3) to a value greater than the uncompressed or free volume of the elastomeric elements (54, 56). This extra volume provides for the subsequent compression of the elastomeric elements within the pockets (50, 52) during application of high loads to the belt. The compression of the elastomeric elements is further facilitated by forming each element (54, 56) with a reduced or necked-down region (57).

As further seen in FIG. 2, an annular recess (58) is defined between the coupling sleeve (40) and the front annular step (30) and flange (28) of the mandrel (20). Recess (58) is dimensioned to receive with a clearance fit a tubular extension (60) of a hub member (62). A clearance fit is needed to allow the hub to freely rotate within the recess (58) and around the mandrel. A hexagonal boss (63) is formed on the front face of the tensioner for providing a tool engaging surface for prewinding the tensioner.

The hub (62) is preferably molded from a plastic material and is formed with an outer circular surface (64) which is eccentrically aligned with respect to the longitudinal axis (66) about which the hub pivots. Axis (66) is preferably coaxially aligned with the axis of the mandrel (20) and bolt (22). The eccentricity and radial offset (65) (FIG. 5) of the coaxial mandrel axis and hub pivot axis with the center of circular hub surface (64) provides the necessary radial offset or moment arm to effect belt tightening as the hub is rotatably biased about the mandrel.

A torsion spring (68) is mounted over the mandrel (20) and is nested within an annular chamber (70) formed between the mandrel and hub. One end (72) of the torsion spring is fixed within a recess (74) formed in the immovable mandrel and the other end (76) of the torsion spring is anchored within a recess (78) formed in the hub. Although a torsion spring is preferred, it is acceptable to use a rubber or elastomeric spring to bias the tensioner against the belt in the manner such as shown in U.S. Pat. No. 4,610,645 or Reissue Pat. No. 30,842.

A retaining clip (80) axially constrains the hub (62) on the mandrel and the hub in turn axially constrains the torsion spring (68). A small axial clearance is maintained between the hub (62) and the retaining clip (80) and between the hub and the annular flange (28) to allow the hub to freely rotate around the mandrel under the biasing force of the torsion spring.

A bearing assembly (82) such as a ball and roller bearing is mounted over the outer surface (64) of hub (62). The inner race (84) of the bearing assembly is rigidly fixed to the hub. It is preferable to inset mold the bearing assembly (82) to the hub during molding to lock the inner race to the hub. Shoulders (86) may be molded on the hub to axially fix the bearing assembly to the hub.

The outer race (88) of the bearing assembly is securely fixed to the inner surface of idler pulley (90). Idler pulley (90) is preferably molded of a plastic material and preferably formed of the same material as hub

(62) so that the hub and pulley may be simultaneously molded around the bearing assembly (82). Circumferential ribs (92) are formed on the inner surface of the idler pulley to lock the idler pulley within circumferential grooves (94) formed within the outer surface of the outer race (88).

A pawl actuator (9) includes a slotted head (98) and a cylindrical body (100) which freely passes through a bore formed through the hub (62). A pawl (102) is securely fixed to the actuator body such as by an interference fit. As seen in FIG. 3, the pawl (102) is a double acting pawl which is spring biased against the outer surface of the coupling sleeve (40) by a leaf spring (104).

The leaf spring (104) is fixed to a slotted boss (105) molded on the hub and forms an over-center mechanism with cam lobe (106) formed on the pawl (102). By turning or rotating the pawl actuator (96), such as with a screwdriver applied to slotted head (98), the leaf spring (104) may be deflected upwardly via cam lobe (106) to provide selective engagement between the first and second pawl dogs (108, 110) and the coupling sleeve (40). Once the tip of cam lobe (106) passes the elbow (112) on the end of the leaf spring, one or the other of the pawl dogs will be snapped into contact with the coupling sleeve, depending on the direction of rotation of the pawl actuator. Although two pawl dogs are illustrated, only one pawl dog (110) is required to carry out the invention.

As best seen in FIGS. 3 and 6, the outer surface of the coupling sleeve (40) is provided with two sets of serrated ratchet teeth for selective engagement with the double acting pawl (102). A first set of ratchet teeth (114) is provided for preventing clockwise rotation of the hub via engagement with the first pawl dog (108), while a second set of ratchet teeth (116) is provided for limiting counterclockwise rotation of the hub via engagement with the second pawl dog (110).

Although only one set of ratchet teeth is needed to carry out the invention, i.e., the second set (116), two sets are preferred for facilitating installation and repair of the tensioner (18), as described in detail in U.S. Pat. No. 4,634,407. The tensioner (18) is shown in FIG. 3 in a prewound and preloaded condition where the first pawl dog (108) engages the first set of ratchet teeth (114). In this position the tensioner may be easily installed without interfering with the belt. Moreover, no force is required to deflect the idler pulley (90) away from the belt since by initially rotating the pulley (90) in a clockwise direction about the mandrel as shown in FIG. 3 and engaging the first pawl dog (108) with the first set of ratchet teeth (114), the biasing force of the prewound torsion spring (68) is held in check.

Once the tensioner (18) is installed on engine block (24), the first pawl dog (108) may be disengaged from the first set of ratchet teeth (114) by rotating the pawl actuator (96). The torsion spring (68) is then free to rotate the pulley in a counterclockwise direction as seen in FIG. 3 and to bias the idler pulley (90) against a belt.

During the prewinding of the torsion spring (68), engagement surfaces (36) on the mandrel abut engagement surfaces (46) on the coupling sleeve to provide a positive driving or winding force therebetween thereby allowing the first pawl dog (108) to engage the first set of ratchet teeth (114). When the first pawl dog (108) is released, the tensioner takes the general configuration shown in FIG. 6 representing the belt-engaging operative position shown in FIG. 1.

In the operative position depicted in FIG. 6, the elastomeric elements (54, 56) are slightly compressed between the engagement surfaces (38) and (44) of the mandrel (20) and coupling sleeve (40). The compressive force is produced by the reaction force of the idler pulley (90) which is biased against the belt by the torsion spring (68). In effect, the belt pushes back against the idler pulley which in turn transfers this force to the hub and pawl (102). The second pawl dog (110) is then forced against the second set of ratchet teeth (116) to force the coupling sleeve in a clockwise direction. This action results in the coupling sleeve arm (42) squeezing or compressing the elastomeric elements (54, 56) against the engagement arms (34) over an arc (118) as seen in FIG. 6.

Thus, instead of an unyielding connection formed between the ratchet and pawl elements such as provided in prior designs, a resilient yielding connection is provided by the present invention in the form of the elastomeric elements (54, 56). When the surface upon which the tensioner (18) and its associated pulleys are mounted undergoes thermal expansion as shown in FIG. 1, the elastomeric elements are further compressed by the increased belt tension to allow the idler pulley (90) to pivot away from the belt to relieve the increased belt tension.

An added benefit of forming a resilient connection between the idler pulley (90) and the engine block (24) is the vibration damping provided by the elastomeric elements (54, 56). Belt vibrations transmitted to the idler pulley (90) are damped by the elastomeric elements as they expand and contract under the variable loading induced by the belt vibrations. This ability to damp vibrations helps to increase belt life and enhance belt performance.

Another benefit provided by the elastomeric elements (54, 56), or by any other suitable biasing elements, is the improved response or reaction time of the tensioner after it has compressed the biasing elements and begins to follow the belt back to its neutral or nominal operating position. That is, under this "return" condition, the biasing force provided by the expanding biasing elements is added to the biasing force of the torsion spring to yield a greater total return force urging the idler pulley against the belt. Tensioners which employ frictional vibration dampers require the torsion spring to overcome the frictional resistance of such vibration dampers thereby detracting from the total force available to maintain firm contact between the idler pulley and the belt. This results in generally larger amplitude belt vibrations and a greater likelihood of belt slippage and belt squeal as compared to the present invention.

Obviously, numerous modifications and variations of the present invention are possible in light of the above teachings. It is therefore to be understood that within the scope of the appended claims, the invention may be practiced otherwise than as specifically described herein.

What is claimed is:

1. A belt tensioner, comprising
   mounting means for mounting said tensioner to a support surface;
   a hub operatively associated with said mounting means;
   means operatively associated with said hub for biasing said hub for eccentric movement about said mounting means;
   a pulley rotatably connected to said hub;

coupling means for interconnecting said hub and said mounting means and for limiting said eccentric movement of said hub about said mounting means; and biasing means operatively associated with said coupling means for allowing limited movement of said coupling means and said hub about said mounting means.

2. The tensioner of claim 1, wherein said mounting means comprises a mandrel having a bore formed therein for receiving a fastener.

3. The tensioner of claim 1, wherein said means for biasing said hub comprises a torsion spring having one end portion connected to said mounting means and an opposite end portion connected to said hub.

4. The tensioner of claim 1, wherein said coupling means comprises a sleeve member rotatably mounted over said mounting means.

5. The tensioner of claim 1, wherein said biasing means comprises at least one elastomeric element.

6. The tensioner of claim 1, further comprising ratchet and pawl means interconnecting said hub and said coupling means.

7. The tensioner of claim 6, wherein said ratchet and pawl means comprises a pawl mounted on said hub and a plurality of teeth provided on said coupling means.

8. The tensioner of claim 1, wherein said coupling means is mounted over said mounting means to form at least one pocket therebetween and wherein said biasing means is disposed within said at least one pocket.

9. The tensioner of claim 8, wherein said coupling means and said mounting each comprises engagement means for engaging and compressing said biasing means.

10. The tensioner of claim 1, wherein said coupling means is mounted on said mounting means so as to define an annular recess therebetween for receiving a portion of said hub for rotation of said hub therein.

* * * * *

UNITED STATES PATENT AND TRADEMARK OFFICE
CERTIFICATE OF CORRECTION

PATENT NO. : 4,808,148
DATED : February 28, 1989
INVENTOR(S) : Glen D. Holtz

It is certified that error appears in the above-identified patent and that said Letters Patent is hereby corrected as shown below:

Column 1, line 29 "he" should read "the" (first occurrence).

Column 5, line 7 "(9 )" should read "(96)".

Signed and Sealed this

Twenty-third Day of January, 1990

*Attest:*

JEFFREY M. SAMUELS

*Attesting Officer*   *Acting Commissioner of Patents and Trademarks*